United States Patent Office 3,324,188
Patented June 6, 1967

3,324,188
CATALYTIC ISOMERIZATION OF HYDROCARBONS
Allen H. Keough, Holden, Mass., assignor to Norton Company, Worcester, Mass., a corporation of Massachusetts
No Drawing. Filed June 2, 1961, Ser. No. 114,318
2 Claims. (Cl. 260—666)

This invention relates to a process for the isomerization of hydrocarbons to produce more desirable branched chain hydrocarbons as motor fuel components from less desirable low octane number materials.

Amorphous gels of alumina and of silica alumina have been typically used as catalysts in hydrocarbon conversion reactions. More recently synthetic crystalline zeolites have been found to have advantages over the amorphous materials. Catalytic processes of the prior art, however, have suffered from disadvantages. Improvement in catalytic activity is of course continually sought as are catalytic processes which are economical by reason of the particular activity of the catalyst for a specific or broad class of reactions and/or by reason of the stability of the catalyst to the particular conditions of operation of the process.

It is therefore an object of this invention to provide a catalytic process for the isomerization of hydrocarbons of improved efficiency.

It has been found that new synthetic zeolites of the mordenite class having an Si to Al ratio of 5 to 1, which materials and methods of producing them are disclosed in copending application No. 80,552 of Leonard B. Sand, now abandoned are very active cataylsts for isomerization reactions.

The synthetic zeolites useful in my invention and described in copending application No. 80,552 may be formed by heating a silico-alumina source such as commercial pumice with sodium silicate. The material may also be formed by heating an amorphous silica with sodium aluminate and sodium silicate. The conditions and techniques for making synthetc mordenites are more fully speciffied in the application of Leonard B. Sand referred to above. The material can be represented, in the acid form, by the formula $H_2Al_2Si_{10}O_{24}(H_2O)_{6.71}$ when fully hydrated. Naturally the above is an idealized formula. Depending on the degree of acid treatment, a portion of the aluminum may be removed from the material without apparent change in the structure. Then the silicon to aluminum ratio may not be exactly 5 to 1, but may be higher.

The hydrogen exchanged form of the synthetic mordenites are particularly useful in this invention as are the aluminum exchanged forms, as illustrated by the following examples.

Example 1

The hydrogen exchanged form of a synthetic mordenite prepared according to the teachings of application Ser. No. 80,552 was prepared by sulfuric acid treatment of the cation form. The material was then treated in an all glass reactor fitted with a constant feed liquid inlet, pre-heater, consenser, and cooled receiver, by purging with a stream of nitrogen at 400° C. for 1.5 hours. Cyclohexene, at a liquid hourly space velocity of 2.3, was added to the reactor at 400° C. through the liquid feed inlet. At the end of the run the liquid in the receiver weighed 83% of the amount fed into the reactor and was substantially 100% methyl cylopentene, together with a small part of an unidentified volatile gas. No cyclohexene was present in the product.

Example 2

The conditions of Example 1 were repeated except that the aluminum exchanged form of synthetic mordenite was substituted for the hydrogen form. The liquid hourly flow rate in this case was 1.8. In this case the product appeared to be identical to the product of Example 1, but the yield was 84% by weight.

The isomerization process is accompanied by a small amount of cracking as is indicated by the production in each example of some light gas.

It has been found that the synthetic zeolites of the mordenite class, more particularly described in the Sand application herein referred to, are effective as catalysts in the present invention whether formed from silicate sources such as volcanic glass or from silica sources such as diatomoceous earth as disclosed in the Sand application.

I claim:

1. A process for improving the octane rating of hydrocarbons by rearranging the carbon skeleton comprising contacting cyclohexene at an elevated temperature with the hydrogen exchanged form of a crystalline mordenite having a silicon to aluminum ratio of at least 5 to 1, and recovering a product containing methyl cyclopentene.

2. A process for improving the octane rating of hydrocarbons by isomerization comprising contacting a stream containing cyclohexene at an elevated temperature with the aluminum exchanged form of a crystalline mordenite having a silicon to aluminum ratio of at least 5 to 1 when in the hydrogen exchanged form.

References Cited

UNITED STATES PATENTS

| | | | |
|---|---|---|---|
| 2,217,252 | 10/1940 | Hoof | 252—455 |
| 2,971,903 | 2/1961 | Kimberlin et al. | 260—683.5 X |
| 3,140,253 | 7/1964 | Plank et al. | 208—120 |

FOREIGN PATENTS 104,311  7/1938  Australia.

DELBERT E. GANTZ, *Primary Examiner.*

ALPHONSO D. SULLIVAN, *Examiner.*

C. E. SPRESSER, P. P. GARVIN, *Assistant Examiners.*